US012269151B1

(12) United States Patent
Yang

(10) Patent No.: US 12,269,151 B1
(45) Date of Patent: Apr. 8, 2025

(54) HIGH-SPEED NAIL COMBINED WITH AN INNER-TOOTHED TUBE HAVING AN EXPANDABLE PADDING

(71) Applicant: PREGUN INDUSTRIAL CO., LTD., Taichung (TW)

(72) Inventor: Wen-Chang Yang, Taichung (TW)

(73) Assignee: PREGUN INDUSTRIAL CO., LTD., Taichung (TW)

( * ) Notice: Subject to any disclaimer, the term of this patent is extended or adjusted under 35 U.S.C. 154(b) by 3 days.

(21) Appl. No.: 18/482,584

(22) Filed: Oct. 6, 2023

(51) Int. Cl.
*B25C 1/12* (2006.01)

(52) U.S. Cl.
CPC .................................... *B25C 1/126* (2013.01)

(58) Field of Classification Search
CPC ....................................................... B25C 1/126
USPC .......................................................... 227/139
See application file for complete search history.

(56) References Cited

U.S. PATENT DOCUMENTS 3,805,472 A * 4/1974 Helderman ............... B25C 1/18 33/392
5,904,284 A * 5/1999 Lin ......................... B25C 1/082 227/8
2011/0297727 A1* 12/2011 Herelier .................. B25C 1/188 227/139
2015/0097016 A1* 4/2015 Masas ..................... B25C 1/163 227/9

FOREIGN PATENT DOCUMENTS

DE 102011075817 A1 * 12/2011 ............. B25B 23/02

* cited by examiner

*Primary Examiner* — Michelle Lopez
(74) *Attorney, Agent, or Firm* — MUNCY, GEISSLER, OLDS & LOWE, P.C.

(57) ABSTRACT

A high-speed nail combined with an inner-toothed tube having an expandable padding includes: a main body including a tubular member and an expandable flange, the tubular member including a first space and a threaded portion, the expandable flange integrally projecting form the tubular member and expending in a nailing direction to define a second space, the second space being in communication with the first space; a drive pin connected to the tubular member by insertion in the nailing direction, including a nail head and a nail body connected to each other, the nail head being located in the first space, the nail body extending from the first space to the second space; and a gunpowder actuating unit received in the first space.

10 Claims, 13 Drawing Sheets

HIGH-SPEED NAIL COMBINED WITH AN INNER-TOOTHED TUBE HAVING AN EXPANDABLE PADDING

BACKGROUND OF THE INVENTION

Field of the Invention

The present invention relates to a high-speed nail, and especially to a high-speed nail combined with an inner-toothed tube having an expandable padding.

Description of the Prior Art

Most of conventional hanging plates used for nails for steel beams on steel structures are usually used with low-speed gunpowder actuated nailing tools (so-called low speed nailing gun 6). The gun body is equipped with a piston rod 61 thereinside. In use, the gunpowder actuator 62 explodes to drive the piston rod 61 forward, and the piston rod 61 propels the nail 7 and drives it into the base (such as a cement wall or steel).

The nail body 72 of the conventional nail 7 has a surface rolled to formed straight line patterns, diagonal line patterns, or cross line patterns. During nailing operation, this kind of nail 7 is driven by the piston rod 61 of the above-mentioned gunpowder nailing tool (low speed nailing gun 6). As a portion of the nail tip of nail body 72 penetrates into the steel beam, the nail tip will receive extremely high resistance due to the high density of the steel. At the same time, the nail head 71 of the nail 7 will also bear the strong impact of the piston rod 61. Generally, the nail 7 cannot withstand the interaction of these two forces, and the nail head 71 of the nail 7 or the middle portion of the nail body 72 therefore breaks easily, resulting in a high defect rate of construction. Especially, after each low speed nailing gun 6 has been used for a long time, it causes uneven slopes of the front end of the piston rod 61 and the nail head 71 of the nail 7 with high hardness after long-term impact, which will increase the probability of breakage of the nail head 71, as shown in FIG. 10-13.

The damage caused by the above-mentioned poor construction is not only the breakage of the nail 7, but also the associated hanging plate and high-cost gunpowder actuator 62 used to fire the nail 7. Therefore, every failure of nailing a nail 7 will cause a significant increase in the construction cost.

The present invention is, therefore, arisen to obviate or at least mitigate the above-mentioned disadvantages.

SUMMARY OF THE INVENTION

The main object of the present invention is to provide a high-speed nail combined with an inner-toothed tube having an expandable padding which has a simple structure and effectively save unnecessary waste of steel, and is the optimal design having strong strength for pulling. Under the global common goal of less energy and carbon for being friendly to the earth, the usages of iron material and copper material for making each high-speed nail combined with an inner-toothed tube can be reduced by more than 58% and more than 30%, respectively.

To achieve the above and other objects, the present invention provides a high-speed nail combined with an inner-toothed tube having an expandable padding, wherein the high-speed nail combined with the inner-toothed tube having the expandable padding includes: a main body, a drive pin and a gunpowder actuating unit, the main body including a tubular member and an expandable flange, the tubular member including a first space and a threaded portion, the expandable flange integrally projecting form the tubular member and expending in a nailing direction to define a second space, the second space being in communication with the first space; the drive pin being connected to the tubular member by insertion in the nailing direction, the drive pin including a nail head and a nail body connected to each other, the nail head being located in the first space, the nail body extending from the first space to the second space; and the gunpowder actuating unit being received in the first space.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
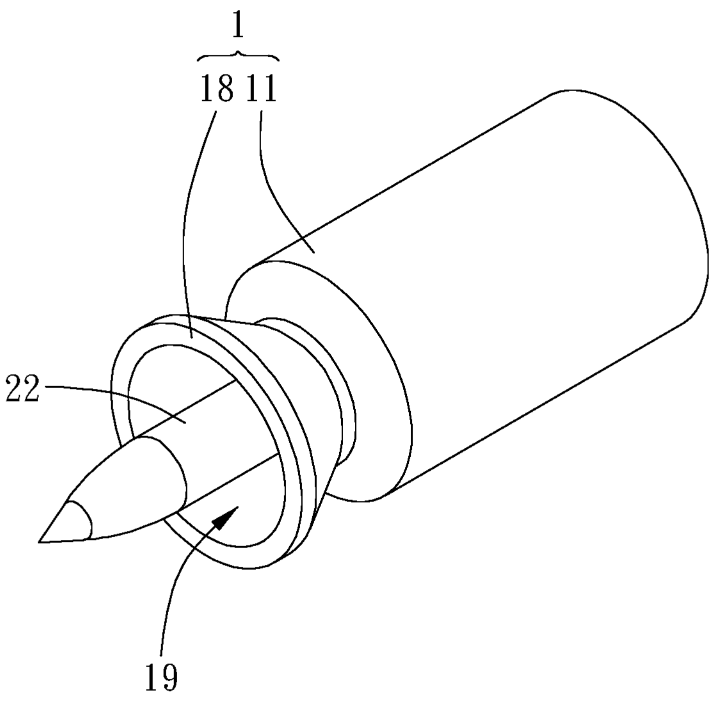
FIG. 1 is a stereogram of an exemplary embodiment of the present invention.
Figure 2:
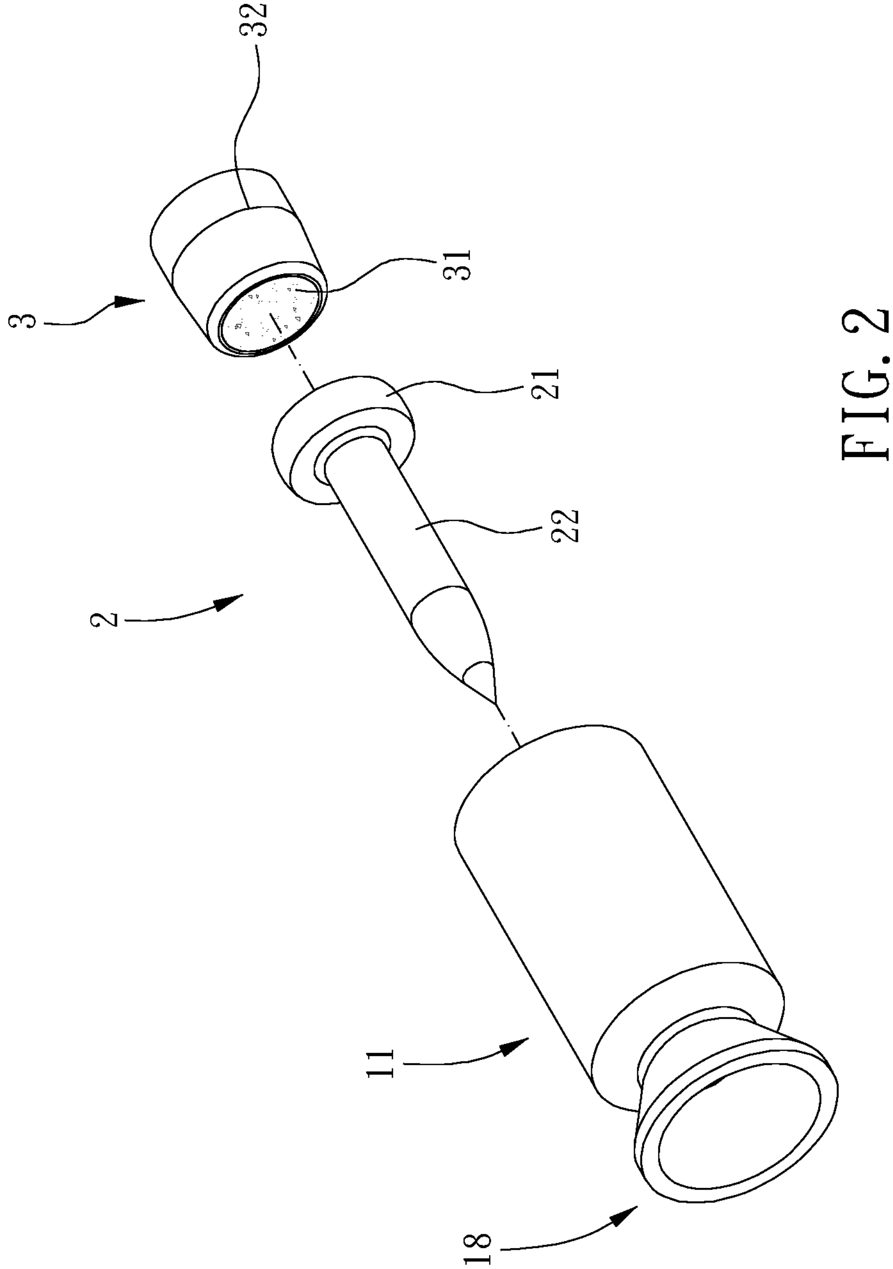
FIG. 2 is a breakdown drawing of FIG. 1.
Figure 3:
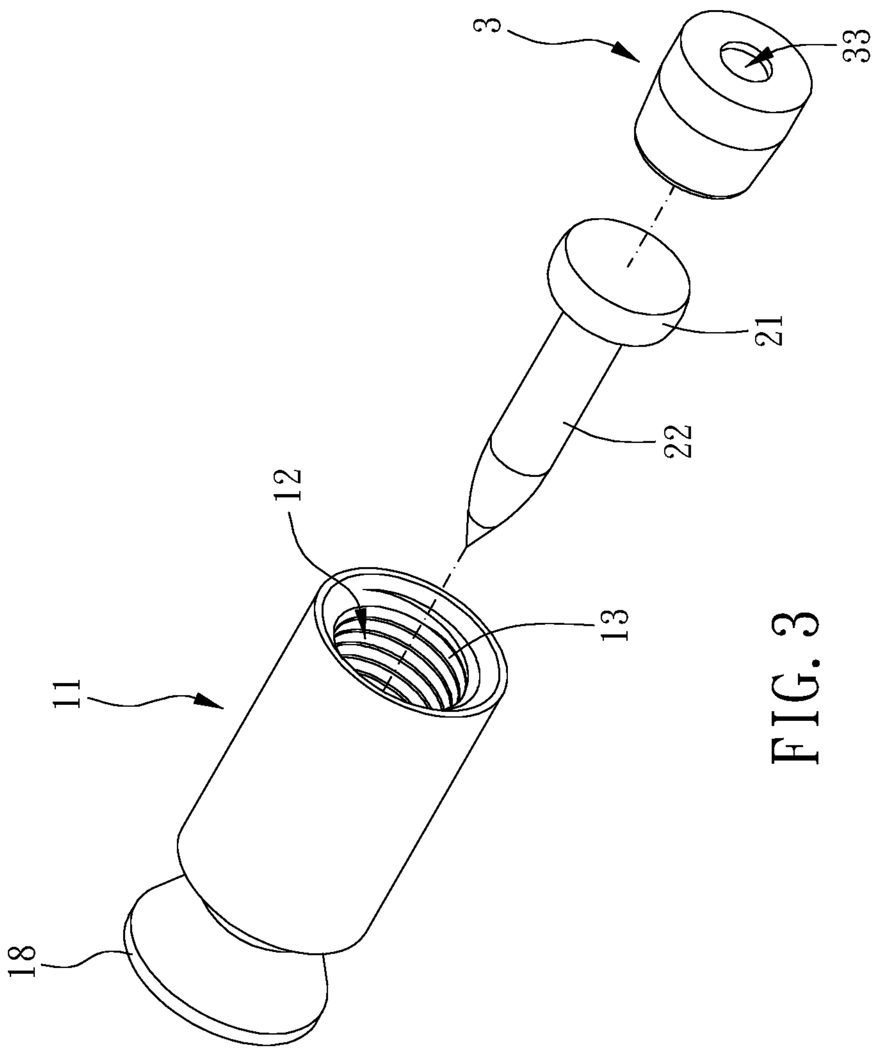
FIG. 3 is another breakdown drawing of FIG. 1.
Figure 4:
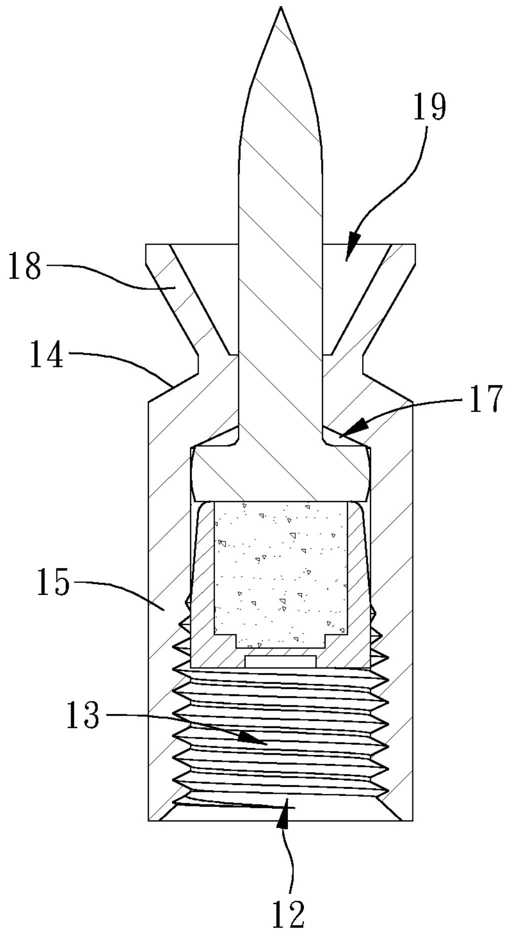
FIG. 4 is a cross-sectional view of FIG. 1.
Figure 5:
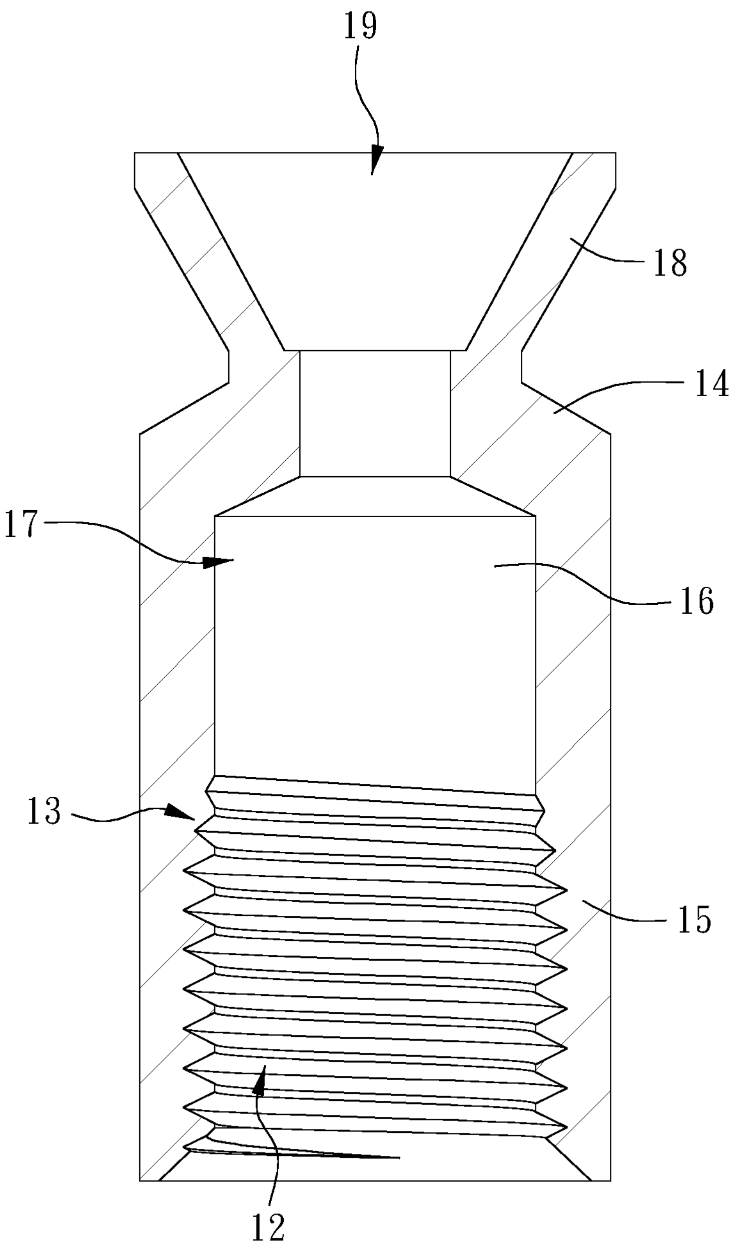
FIG. 5 is a cross-sectional view of a main body of an exemplary embodiment of the present invention.
Figure 6:
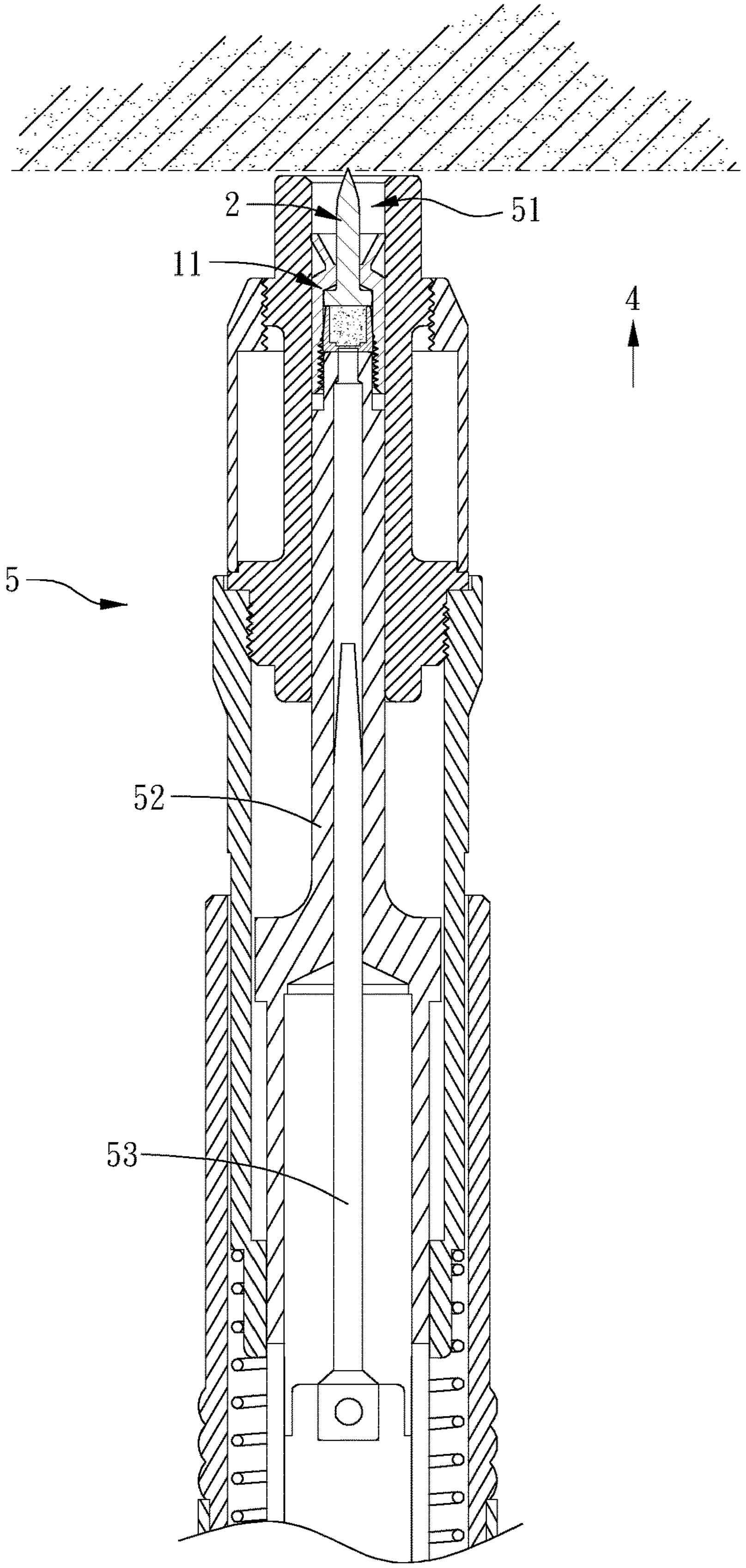
FIG. 6 is a drawing showing an application of an exemplary embodiment of the present invention.
Figure 7:
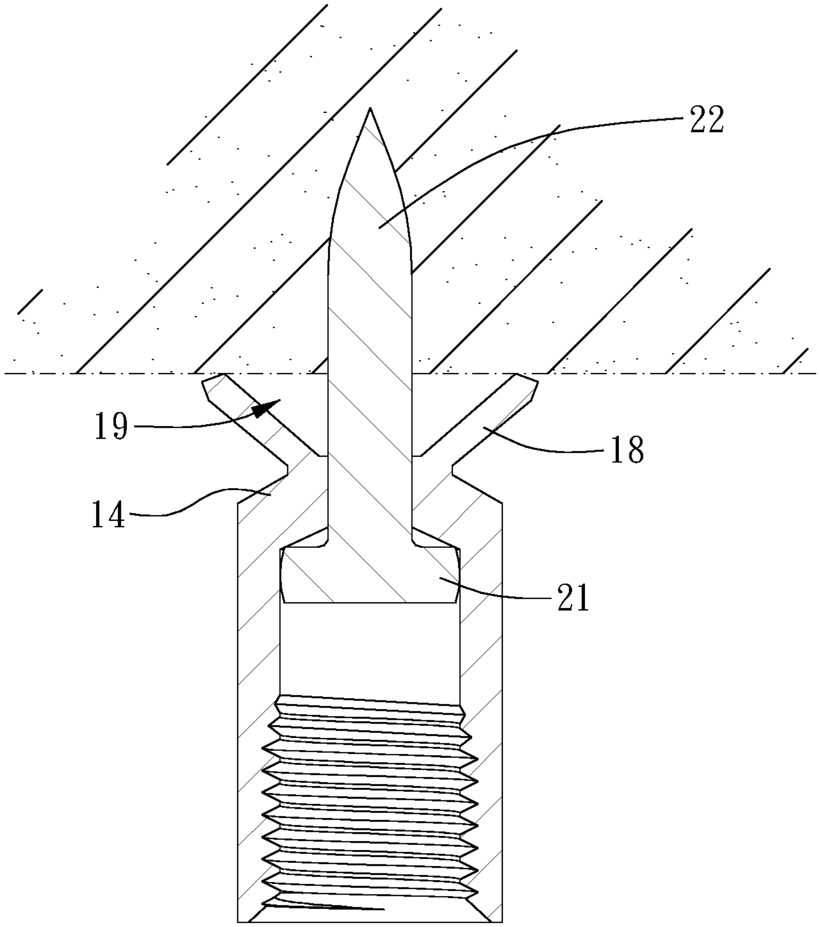
FIG. 7 is a drawing showing a high-speed nail combined with an inner-toothed tube having an expandable padding for penetrating into a steel according to an exemplary embodiment of the present invention.
Figure 8:
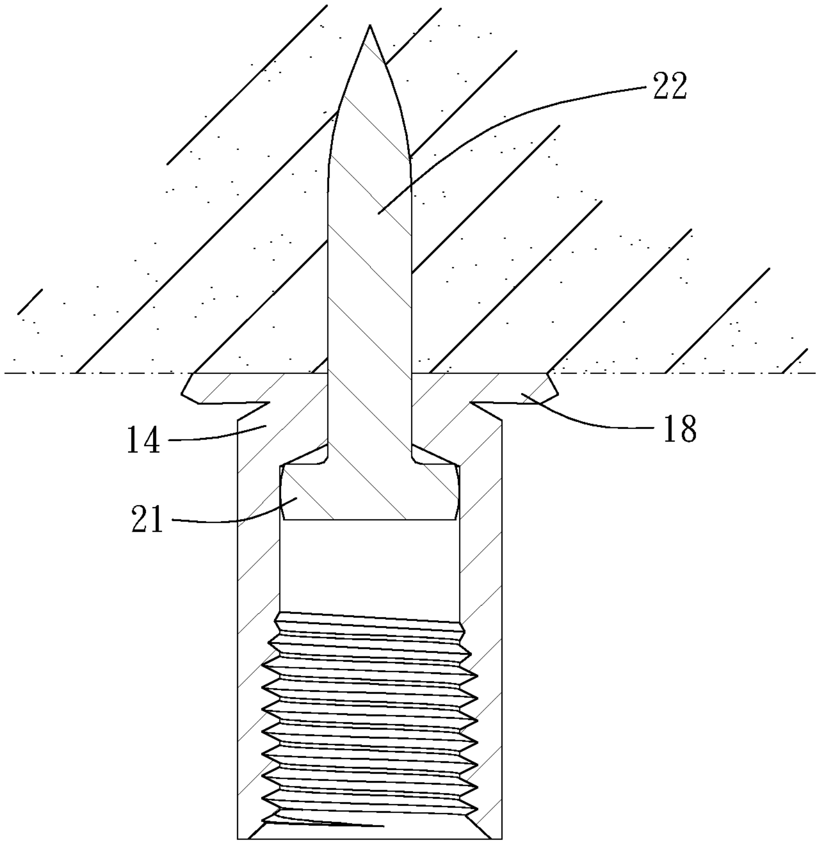
FIG. 8 is a drawing showing the high-speed nail combined with the inner-toothed tube having the expandable padding penetrating into a steel according to an exemplary embodiment of the present invention.
Figure 9:
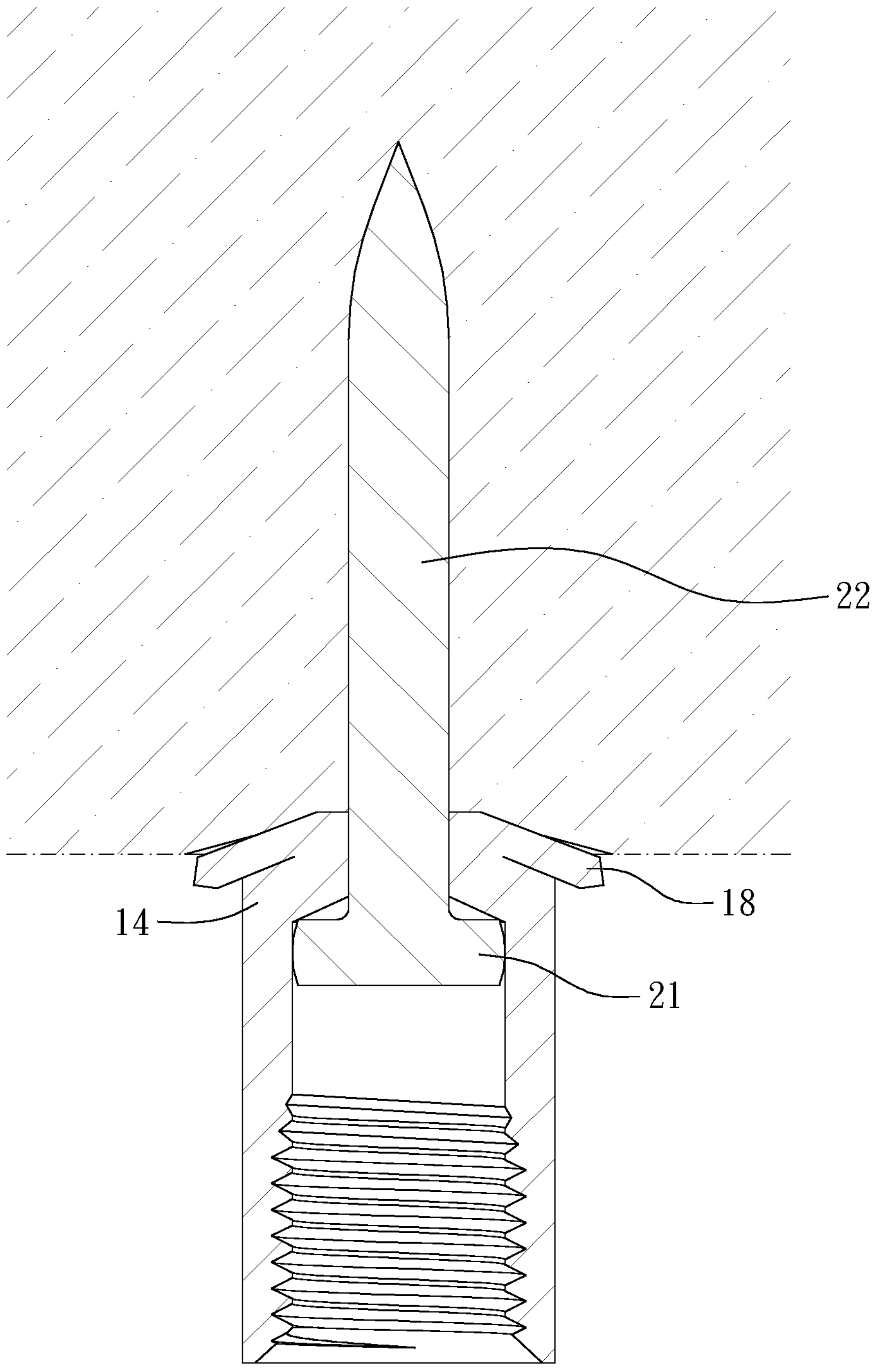
FIG. 9 is a drawing showing the high-speed nail combined with the inner-toothed tube having the expandable padding penetrating into a cement base according to an exemplary embodiment of the present invention.
Figure 10:
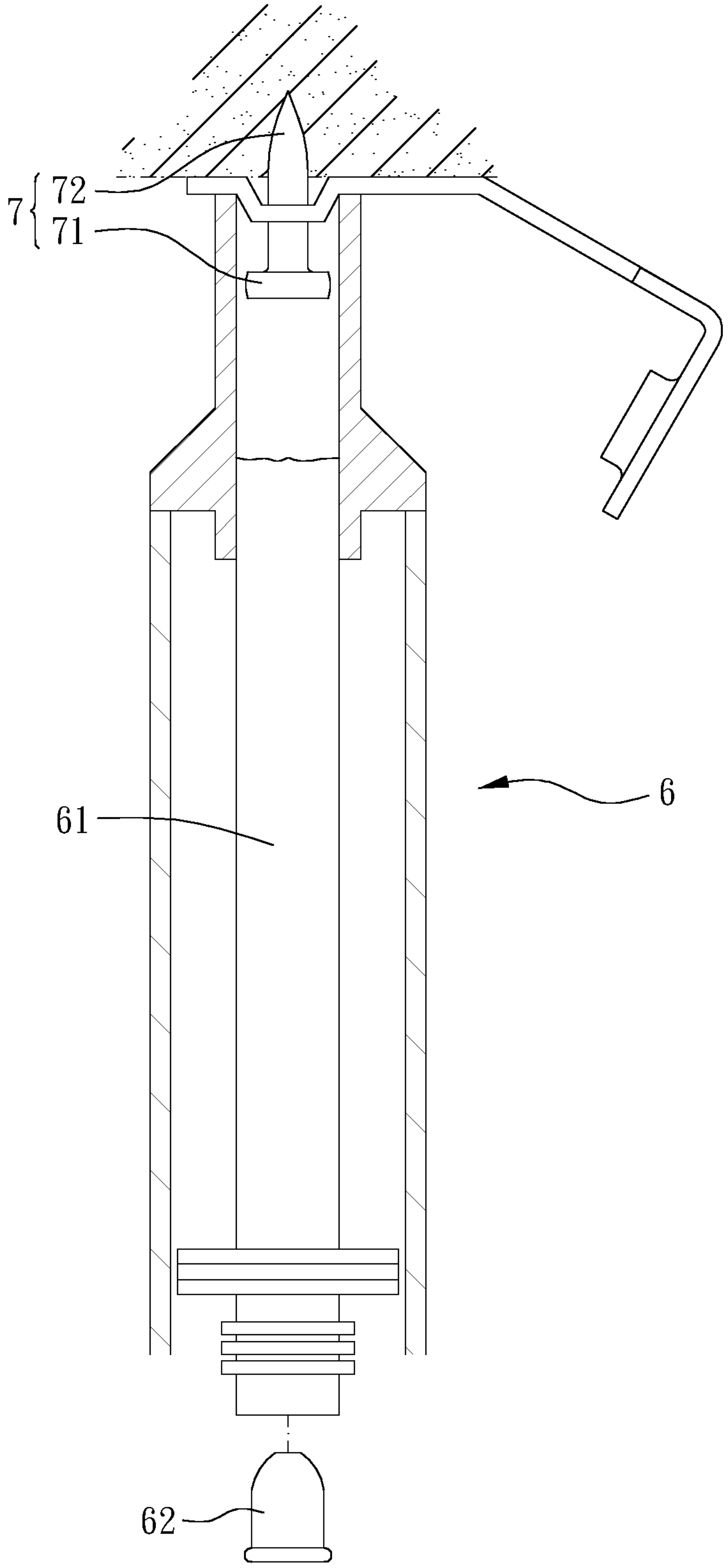
FIG. 10 PRIOR ART
FIG. 10 is a drawing showing operation of a conventional low speed nailing gun with a hanging plate according to an exemplary embodiment of the present invention.
Figure 11:
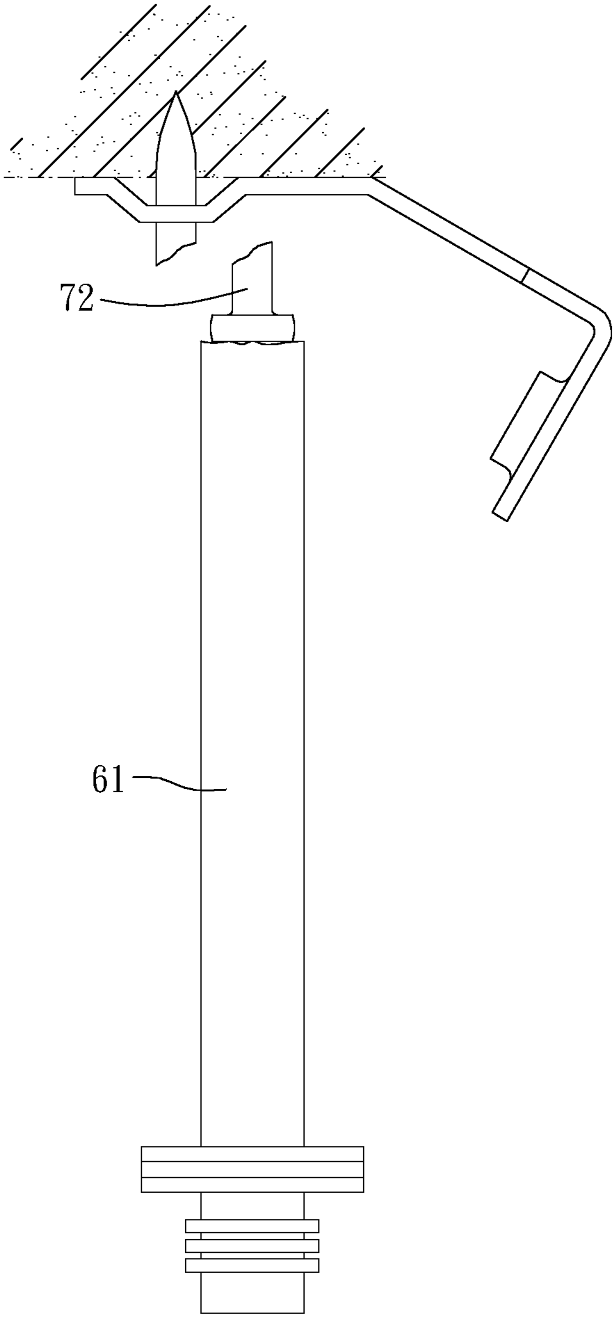
FIG. 11 PRIOR ART
FIG. 11 is a drawing showing that a nail used for a steel beam is broken during a conventional nailing process.
Figure 12:
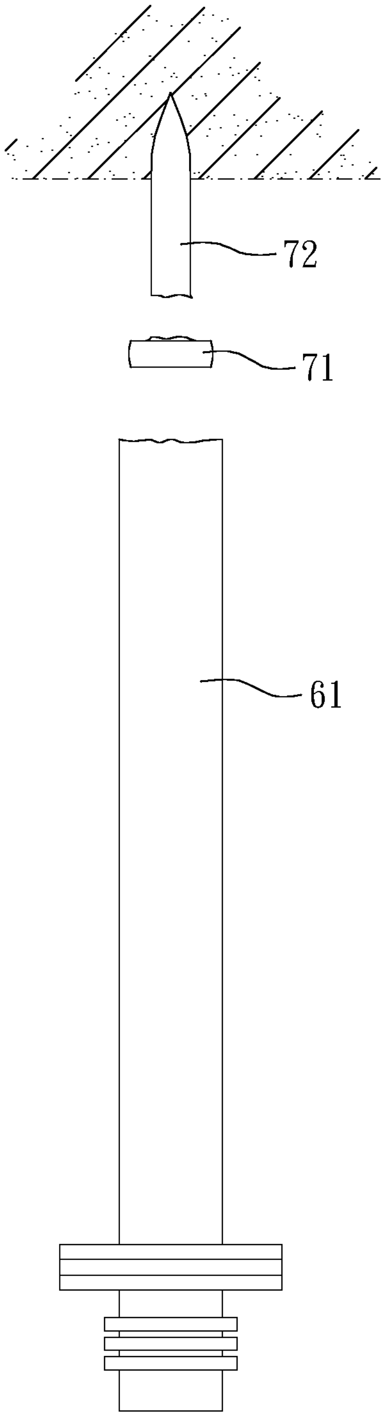
FIG. 12 PRIOR ART
FIG. 12 is a drawing showing that a nail used for a steel beam is broken at its nail head due to an uneven end surface of a piston rod during a conventional nailing process.
Figure 13:
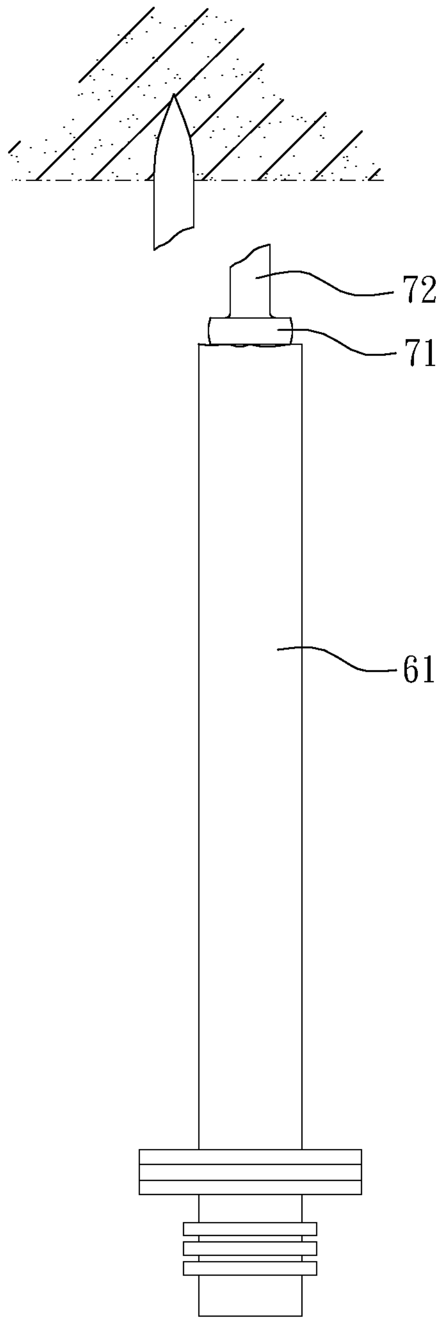
FIG. 13 PRIOR ART
FIG. 13 is a drawing showing that a nail used for a steel beam is broken at its nail body due to an uneven end surface of a piston rod during a conventional nailing process.

Please refer to FIGS. 1 to 9 for an exemplary embodiment of the present invention. A high-speed nail combined with an inner-toothed tube having an expandable padding of the present invention includes a main body 1, a drive pin 2 and a gunpowder actuating unit 3.

The main body 1 includes a tubular member 11 and an expandable flange 18, and the tubular member 11 includes a first space 12 and a threaded portion 13. When the high-speed nail combined with the inner-toothed tube having the expandable padding is nailed in a base, the threaded portion 13 is configured to be screwed with a member for hanging, fixing or supporting objects. The expandable flange 18 integrally projects form the tubular member 11 and expends in a nailing direction 4 to define a second space 19, and the second space 19 is in communication with the first space 12. In this embodiment, the expandable flange 18 is a conical tubular member, and in the nailing direction 4, the expandable flange 18 has a length smaller than a length of the tubular member 11 so that the drive pin 2 is protrusive beyond the expandable flange 18 for alignment.

The drive pin 2 is connected to the tubular member 11 by insertion in the nailing direction 4, and the drive pin 2 and the tubular member 11 are preferably coaxially arranged. When the high-speed nail combined with the inner-toothed tube having the expandable padding is nailed in the base, the drive pin 2 can evenly support the tubular member 11 to bear the weight of the object. Specifically, the drive pin 2 includes a nail head 21 and a nail body 22 connected to each other, the nail head 21 is located in the first space 12, and the nail body 22 extends from the first space 12 to the second space 19 for inserting into the base. During the drive pin 2 is inserted into the base in the nailing direction 4, the nail head 21 drives the nail body 22 move toward the base and the nail head 21 urges the expandable flange 18 to tightly abut the base, so that the main body 1 can be stably positioned to the base and cannot rotate relative to the base.

The gunpowder actuating unit 3 is received in the first space 12, for actuating the drive pin 2. The impact force generated by the explosion of the gunpowder actuating unit 3 acts directly on the drive pin 2. Compared with the traditional method, this driving method can save the usage of material of housing of the gunpowder actuating unit 3 and processing costs, and can reduce the impact loss of the piston rod, so it can effectively reduce operation costs.

It is noted that the drive pin 2, which is directly driven by the explosion of the gunpowder actuating unit 3, has a high injection speed and impact force, so it can effectively insert into the base made of a harder material (such as steel). In actual tests, it successfully inserts into steel beams up to more than 95%. Additionally, the expandable flange 18 which is interposed between the nail head 21 and the base will expand and deform accordingly as the nail body 22 penetrates into the base with different depths (depends on different explosion force generated by the gunpowder actuating unit 3). As such, the impact force can be properly and evenly dispersed to the base so as to provide a buffering effect, thereby preventing the drive pin 2 from penetrating the base.

The gunpowder actuating unit 3 includes an actuating portion 31 and a gunpowder barrel 32, the actuating portion 31 is received in the gunpowder barrel 32, and the gunpowder barrel 32 is positioned in the first space 12. In this embodiment, the actuating portion 31 is solid gunpowder, the gunpowder barrel 32 is made of plastic material, and the gunpowder barrel 32 is abutted in tight fit against an inner wall surface 16 of the tubular member 11 defining the first space 12. The inner wall surface 16 includes the threaded portion 13, and the inner wall surface 16 further includes a non-threaded portion 17 corresponding to the nail head 21.

When the high-speed nail combined with the inner-toothed tube having the expandable padding is installed in a gun barrel 51 of a nailing gun 5, the tubular member 11 and an inner surface of the gun barrel 51 are abutted against each other, and a side of the gunpowder barrel 32 opposite to the drive pin 2 is configured to be abutted against a pin sleeve 52. A side of the gunpowder barrel 32 opposite to the drive pin 2 includes a recess 33, and the recess 33 is configured to be impacted by a firing pin 53 to actuate the actuating portion 31.

Preferably, in a radial direction of the tubular member 11, the expandable flange 18 is not protrusive beyond the tubular member 11, so that it does not affect the tightness of the wall surfaces of the tubular member 11 and the gun barrel 51, and so that the impact force generated by the explosion of the gunpowder actuating unit 3 can effectively and reliably propel the drive pin 2.

Specifically, the tubular member 11 further includes an upper portion 14 and a body portion 15, the body portion 15 is transverse to and protrusive form a side of the upper portion 14, the expandable flange 18 is transverse to and protrusive form another side of the upper portion 14, and the nail head 21 is interposed between the upper portion 14 and the gunpowder actuating unit 3. The body portion 15 is cylindrical, and the upper portion 14 is tapered from the body portion 15 in the nailing direction 4. Specifically, the body portion 15 has a length larger than two times a length of the gunpowder barrel 32 so that the body portion 15 can provide sufficient space for the user to change the dose of the actuating portion 31, thereby changing the explosive impact force to adjust the depth of the nail body 22 into the base.

Preferably, the thickness of the upper portion 14 is larger than the thickness of the expandable flange 18 so that the upper portion 14 has better structural strength to withstand the stress from the nail head 21, and the thicker upper portion 14 can prevent the drive pin 2 from penetrating the base and disperses stress, the thinner expandable flange 18 facilitates deformation and engagement to the base. A ratio of the thickness of the upper portion 14 and the thickness of the expandable flange 18 is, for example, at least larger than 1.5, taking into account structural strength, deformation capacity and material usage. Similarly, the thickness of the upper portion 14 is larger than a thickness of the body portion 15.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A high-speed nail combined with an inner-toothed tube having an expandable padding including:

a main body including a tubular member and an expandable flange, the tubular member including a first space and a threaded portion, the expandable flange integrally projecting form the tubular member and expending in a nailing direction to define a second space, the second space being in communication with the first space;

a drive pin connected to the tubular member by insertion in the nailing direction, including a nail head and a nail body connected to each other, the nail head being located in the first space, the nail body extending from the first space to the second space; and a gunpowder actuating unit received in the first space.

2. The high-speed nail combined with the inner-toothed tube having the expandable padding of claim 1, wherein the gunpowder actuating unit includes an actuating portion and a gunpowder barrel, the actuating portion is received in the gunpowder barrel, and the gunpowder barrel is positioned in the first space.

3. The high-speed nail combined with the inner-toothed tube having the expandable padding of claim 2, wherein the tubular member further includes an upper portion and a body portion, the body portion is transverse to and protrusive form a side of the upper portion, and the expandable flange is transverse to and protrusive form another side of the upper portion.

4. The high-speed nail combined with the inner-toothed tube having the expandable padding of claim 3, wherein the upper portion has a thickness larger than a thickness of the expandable flange.

5. The high-speed nail combined with the inner-toothed tube having the expandable padding of claim 3, wherein the body portion is cylindrical, and the upper portion is tapered from the body portion in the nailing direction.

6. The high-speed nail combined with the inner-toothed tube having the expandable padding of claim 3, wherein the nail head is interposed between the upper portion and the gunpowder actuating unit.

7. The high-speed nail combined with the inner-toothed tube having the expandable padding of claim 1, wherein the expandable flange is a conical tubular member.

8. The high-speed nail combined with the inner-toothed tube having the expandable padding of claim 1, wherein in a radial direction of the tubular member, the expandable flange is not protrusive beyond the tubular member.

9. The high-speed nail combined with the inner-toothed tube having the expandable padding of claim 1, wherein the drive pin and the tubular member are coaxially arranged.

10. The high-speed nail combined with the inner-toothed tube having the expandable padding of claim 4, wherein the body portion is cylindrical, and the upper portion is tapered from the body portion in the nailing direction; the nail head is interposed between the upper portion and the gunpowder actuating unit; the expandable flange is a conical tubular member; in an radial direction of the tubular member, the expandable flange is not protrusive beyond the tubular member; the drive pin and the tubular member are coaxially arranged; the actuating portion is solid gunpowder; the gunpowder barrel is made of plastic material; the gunpowder barrel is abutted in tight fit against an inner wall surface of the tubular member defining the first space; a ratio of the thickness of the upper portion and the thickness of the expandable flange is at least larger than 1.5; the threaded portion is disposed on the inner wall surface of the tubular member, and the inner wall surface includes a non-threaded portion corresponding to the nail head; the body portion has a length larger than two times a length of the gunpowder barrel; the thickness of the upper portion is larger than a thickness of the body portion; when the high-speed nail combined with the inner-toothed tube having the expandable padding is installed in a gun barrel of a nailing gun, the tubular member and an inner surface of the gun barrel are abutted against each other, and a side of the gunpowder barrel opposite to the drive pin is configured to be abutted against a pin sleeve; a side of the gunpowder barrel opposite to the drive pin includes a recess, and the recess is configured to be impacted by a firing pin to actuate the actuating portion; in the nailing direction, the expandable flange has a length smaller than a length of the tubular member, and the drive pin is protrusive beyond the expandable flange.

* * * * *